US008061786B2

(12) United States Patent
Drumm et al.

(10) Patent No.: US 8,061,786 B2
(45) Date of Patent: Nov. 22, 2011

(54) BRAKE SYSTEM FOR MOTOR VEHICLES

(75) Inventors: Stefan Drumm, Saulheim (DE); Lothar Schiel, Hofheim (DE)

(73) Assignee: Continental Teves AG & Co. Ohg, Frankfurt (DE)

( * ) Notice: Subject to any disclaimer, the term of this patent is extended or adjusted under 35 U.S.C. 154(b) by 804 days.

(21) Appl. No.: 11/664,668

(22) PCT Filed: Oct. 13, 2005

(86) PCT No.: PCT/EP2005/055245
§ 371 (c)(1),
(2), (4) Date: Jan. 16, 2008

(87) PCT Pub. No.: WO2006/042823
PCT Pub. Date: Apr. 27, 2006

(65) Prior Publication Data
US 2008/0258546 A1 Oct. 23, 2008

(30) Foreign Application Priority Data

Oct. 15, 2004 (DE) .......................... 10 2004 050 113
Apr. 19, 2005 (DE) .......................... 10 2005 017 958

(51) Int. Cl.
*B60T 8/42* (2006.01)
(52) U.S. Cl. .................. 303/115.4; 303/113.4; 188/358; 60/579
(58) Field of Classification Search ............... 303/115.4, 303/113.4, 114.1, 116.1, 119.1; 188/358, 188/359; 60/579, 580, 547.1, 552
See application file for complete search history.

(56) References Cited

U.S. PATENT DOCUMENTS

| 3,894,390 | A  | * | 7/1975  | Belart et al. ................... 60/552 |
| 5,531,509 | A  | * | 7/1996  | Kellner et al. ............. 303/114.1 |
| 6,058,705 | A  | * | 5/2000  | Schunck ........................ 60/562 |
| 6,494,546 | B1 | * | 12/2002 | Feigel ........................ 303/113.4 |
| 6,641,231 | B2 | * | 11/2003 | Kusano et al. ............. 303/114.1 |
| 6,705,682 | B2 | * | 3/2004  | Kusano et al. ............. 303/114.1 |
| 6,789,857 | B2 | * | 9/2004  | Kusano ...................... 303/114.1 |
| 6,957,871 | B2 | * | 10/2005 | Maki ......................... 303/114.1 |
| 7,104,058 | B2 | * | 9/2006  | Matsuno et al. ................. 60/552 |
| 7,331,641 | B2 | * | 2/2008  | Kusano ...................... 303/114.1 |
| 2003/0030321 | A1 | * | 2/2003 | Kusano et al. ............. 303/114.1 |
| 2008/0258545 | A1 | * | 10/2008 | Drumm ...................... 303/114.1 |

FOREIGN PATENT DOCUMENTS

| DE | 102004025638 | 9/2005 |
| EP |      1078833 | 2/2001 |

* cited by examiner

*Primary Examiner* — Robert Siconolfi
*Assistant Examiner* — Mariano Sy
(74) *Attorney, Agent, or Firm* — Brinks Hofer Gilson & Lione

(57) ABSTRACT

A brake system has a first piston (2) which is coupled to a brake pedal (3), a second piston (4) used to actuate a master cylinder (1), a third piston (5) actuated by the first piston (2) and movable into a force-transmitting connection with the second piston (4), and a pedal travel simulator. The first and the third pistons are coupled depending on the displacement of the third piston (5). The pressurization of a space (11) between the second and the third piston loads the second and third pistons (4, 5) in opposite directions. A pressure-supplying module (13) enables both filling and evacuation of the space (11) as well as its evacuation. A fourth piston (8) between the first piston (2) and the third piston (5) delimits a hydraulic compartment (9) in interaction with the third piston (5). A valve assembly (10) varies the pressure introduced into the space (11).

18 Claims, 2 Drawing Sheets

BRAKE SYSTEM FOR MOTOR VEHICLES

BACKGROUND OF THE INVENTION

The present invention relates to a brake system for motor vehicles comprising a master cylinder to which wheel brake cylinders are connectable, a first piston which is coupled to a brake pedal by way of a push rod that transmits actuating forces, a second piston which actuates the master cylinder, a third piston which can be actuated by the first piston and is movable into a force-transmitting connection with the second piston, with at least one elastic element forming a pedal travel simulator that imparts a pleasant pedal feeling to the operator in a 'brake-by-wire' operating mode, with a means to couple the movements of the first piston and the third piston being activated depending on the displacement travel of the third piston in a housing, with a space between the second and the third pistons to which hydraulic pressure is applicable, wherein a pressurization of the space loads the second and the third pistons in opposite directions, as well as a pressure supplying module, which allows both filling the space with pressure fluid and evacuating it.

'Brake-by-wire' brake systems are employed in motor vehicle technology at an increasing rate. In the brake systems, the brake can be actuated 'independently' in response to electronic signals without any action on the part of the driver. The electronic signals can be output by an electronic stability program ESP or a collision avoidance system ACC, for example. When an independent actuation of this type is superposed on an actuation by the driver, the driver of the motor vehicle notices a reaction in the brake pedal. This reactive effect on the brake pedal can be surprising and unpleasant for the driver so that, in a critical situation in traffic, the driver will not apply the brake pedal to an extent that complies with this situation because the reaction to the brake pedal that is due to the independent actuation of the brake is irritating him.

DE 10 2004 025 638 A1 discloses a brake system of the type mentioned hereinabove. An 'independent actuation' of the prior-art brake system or pressurization of the space is executed in the 'brake-by-wire' operating mode by the electrically controllable pressure-supplying module by means of a likewise electrically operable valve device, which opens or closes a hydraulic connection between the space and the pressure-supplying module, respectively. The fact is considered disadvantageous in the prior-art brake system that boosting of the actuating force generated by the operator is possible only when the electronic unit and the energy supply (battery) provided in the vehicle are intact.

In view of the above, an object of the invention is to disclose a brake system of the type initially referred to, wherein the actuating force is boosted even if the electronic control unit or the electric energy supply fails.

SUMMARY OF THE INVENTION

According to the invention, this object is achieved in that a fourth piston is arranged between the first and the third pistons and delimits a hydraulic compartment in interaction with the third piston, which compartment has a hydraulic connection to a pressure fluid supply tank that is closable by brake pedal application and in which pressure can be built up by the actuating forces, and in that the hydraulic pressure introduced into the compartment allows actuating a valve assembly, by which the pressure introduced into the space can be varied. Preferably, the valve assembly can be integrated in the pressure-supplying module.

In a favorable improvement of the invention, the elastic element forming the pedal simulator is interposed between the push rod and the fourth piston in terms of effect. In the illustrated embodiment, the elastic element is an elastomeric spring made of a compressible material and a compression spring of an approximately incompressibly elastic material, with the latter being arranged in a hydraulic chamber.

In another favorable embodiment of the subject matter of the invention, a hydraulic shut-off device is provided to couple the movements of the first and the third pistons, which is activated depending on the displacement travel of the third piston in the housing. The shut-off device is a closable hydraulic connection, which allows a connection between a simulator chamber and a pressure fluid supply tank when the shut-off device is not activated, the latter connection being closed by the displacement travel of the third piston in the housing.

In a favorable improvement of the subject matter of the invention, the compartment is hydraulically connected to the shut-off device or the pressure fluid supply tank when the pedal is not applied, with this connection being closable by a relative movement of the fourth piston vis-à-vis the third piston. It is thereby achieved that the compartment is unpressurized (tank pressure) when the pedal is not applied, and there is a constantly growing functional relationship between the brake pedal actuating force and the compartment pressure upon brake pedal application.

The hydraulic connection is established e.g. by way of an opening designed in the front wall of the fourth piston and cooperating with a sealing element arranged at the third piston. To realize the hydraulic connection that can be closed by a relative movement of the fourth piston in relation to the third piston, a flow path is preferably designed in the fourth piston in another embodiment, which bypasses a seal arranged between the third and the fourth pistons.

The hydraulic connections between the simulator chamber and the pressure fluid supply tank as comprised in the shut-off device preferably serve also as hydraulic throttling elements for hydraulically damping the pedal travel simulator. It is especially favorable when at least one of the hydraulic throttling elements exhibits a performance that depends on the direction of flow.

In a preferred embodiment, a sensor for determining the angle of rotation is provided to detect the brake pedal position and movement, the output signal whereof is sent to an electronic control unit and serves to actuate the pressure-supplying module. It is additionally appropriate when a pressure sensor is provided to sense the hydraulic pressure output by the pressure-supplying module, the output signal of which is sent to the electronic control unit.

The pressure-supplying module comprises a hydraulic high-pressure accumulator in another design variation.

Another favorable improvement of the invention implies that the pressure-supplying module comprises a means for charging the high-pressure accumulator. Besides, the pressure-supplying module preferably contains electrically controllable valves.

In still another favorable improvement of the subject matter of the invention, the electronic control unit is associated with the pressure-supplying module.

One embodiment of the invention is explained in detail in the following text by making reference to the accompanying schematic drawings.

DETAILED DESCRIPTION OF THE DRAWINGS

Figure 1:
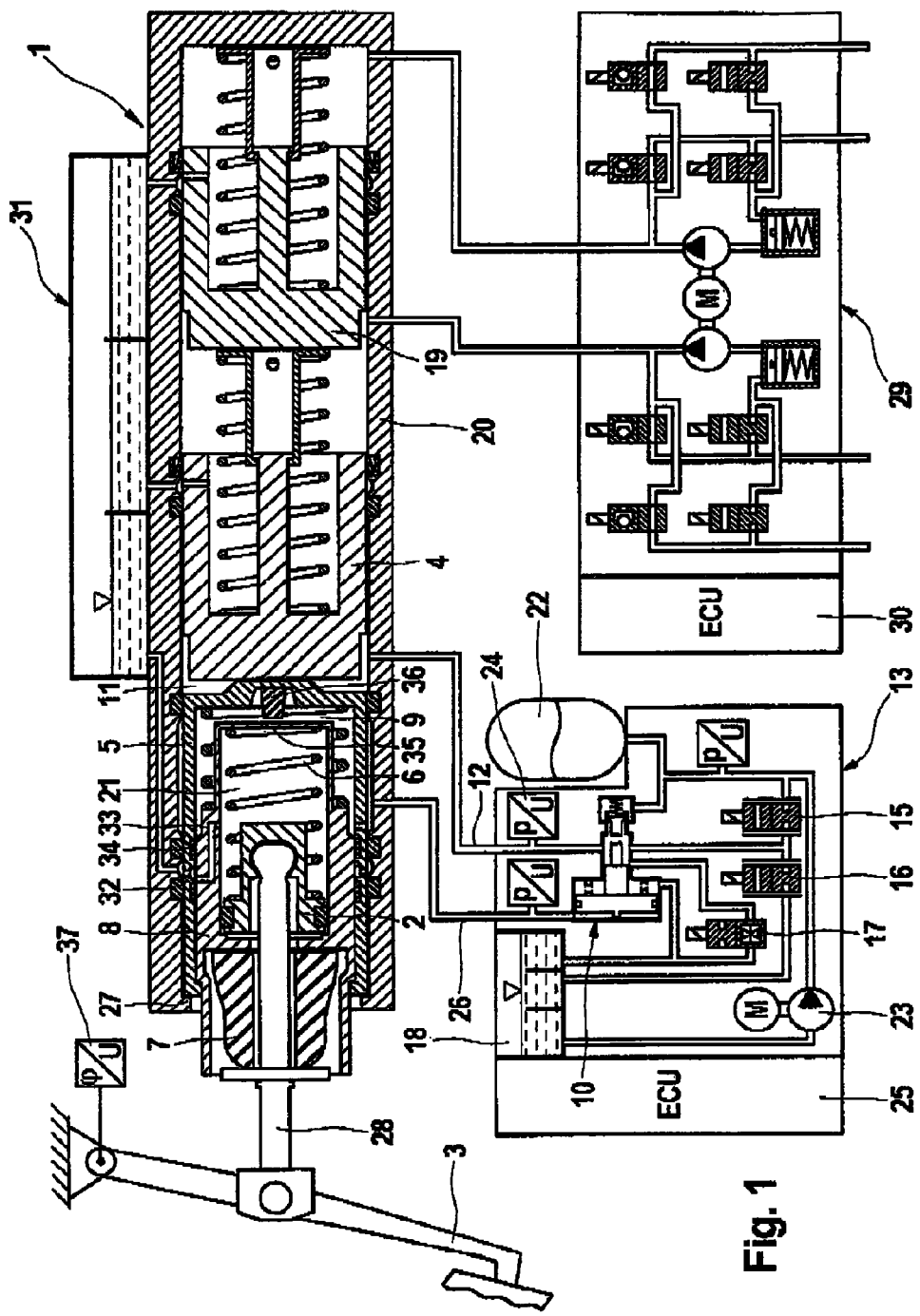
FIG. 1 shows the design of the brake system of the invention.

The brake system of the invention as illustrated in the drawing includes a brake pedal 3, which is connected to a first piston 2 by way of an operating rod 28 in terms of effect. The brake pedal travel can be sensed using a sensor 37 for determining the angle of rotation. The first piston 2 is arranged in a fourth piston 8, and a simulator chamber 21 is provided between the first and the fourth piston 8 in which a compression spring 6 is arranged, moving the first piston 2 into abutment on the fourth piston 8 when the pedal is not applied. The fourth piston 8 is displaceably guided in a third piston 5 and delimits in the latter a hydraulic compartment 9, which is in communication via an opening or a passage 35 with the simulator chamber 21. A movement of the fourth piston 8 relative to the third piston 5 shuts off the passage 35, piston 5 carrying a sealing element 36 for this purpose. Piston seals that can be passed by fluid flow in a travel-responsive manner can be used as a shut-off alternative. An elastic element 7, e.g. an elastomeric spring, is interposed between the operating rod 28 and the fourth piston 8 in terms of effect and, along with the spring 6, forms a pedal travel simulator, that imparts the usual pedal feeling to the operator when the brake system is activated, which corresponds to a customary brake pedal characteristics. This implies that the resistance rises slowly with a small brake pedal travel and increases overproportionally when the brake pedal travel is larger. The above-mentioned compression spring 6 could just as well be arranged in a 'dry' fashion, i.e. outside the simulator chamber 21, e.g. in parallel to the elastomeric spring 7.

In addition, a second piston 4 is provided, which represents an operating piston of a master brake cylinder 1. In the example shown, the master brake cylinder 1 is configured as a tandem master cylinder wherein a fifth piston 19 is connected downstream of the second piston 4. The wheel brakes of the vehicles can bee connected to the master brake cylinder 1 by way of a controllable wheel brake pressure modulation module 29, and an electronic control unit 30 is associated with the wheel brake pressure modulation module 29.

All pistons 2, 4, 5, 8, 19 are accommodated in a housing 20, with the second piston, the third piston, and the fifth piston having the same diameter or identical cross-sectional surfaces in the illustrated design. A space 11 exists between the third piston 5 and the second piston 4, which is connected by means of a hydraulic connection 12 to an electrohydraulic pressure-supplying module 13 that allows pressurization of the space 11. The pressure-supplying module 13 comprises a high-pressure accumulator 22 serving as a hydraulic pressure source, a motor-driven pump 23 for charging the high-pressure accumulator 22, pressure control valves 15, 16, 17, and a pressure fluid supply tank 18. A pressure sensor 24, which can also be integrated in the pressure-supplying module 13, is used to monitor the pressure introduced into the space 11. The high-pressure accumulator 22 furnishes the energy for brake application when the pump 23, due to the mass inertia of its rotor, is unable to immediately supply the pump output that is required for a sudden panic stop or when electric energy is not available to drive the pump 23. Associated with the pressure-supplying module 13 is an electronic control unit 25, to which are sent, among others, the output signals of the sensor 37 for determining the angle of rotation and of the pressure sensor 24 and which is used to actuate the motor-driven pump 23 and the pressure control valves 15 to 17.

In addition, a hydraulically operable valve assembly 10 is inserted into the hydraulic connection 12 between the space 11 and the electrohydraulic pressure-supplying module 13, being controllable by the pressure introduced into the above-mentioned compartment 9 by way of a hydraulic control line 26. Brake boosting can be executed this way also without the participation of electronic components.

Space 11 is pressurized through the connection 12, with the result that the second piston 4 in the master brake cylinder 1 is actuated and the third piston 5 is pressed against a stop 27 in the housing 20, on which the third piston 5 was abutting before the activation of the brake system. The stop 27 in the housing 20 is not necessarily (as illustrated) provided on the dry side of the third piston 5, it can just as well be arranged in the space 11 filled with pressure fluid, for example. Different configurations are possible for the electrically controllable valves used for pressure control. A slide valve could be employed, for example. A preferred valve configuration is the one illustrated, where three separately controllable seat valves are employed. A first pressure control valve 15 controls the pressure buildup, while a second pressure control valve 16 controls the pressure decrease. Both valves are preferably invariably adjustable analog valves, and they are closed in the deenergized condition. A third valve 17 establishes the connection between the space 11 and a pressure fluid supply tank 18 that is necessary for expansion processes due to temperature variations. For this purpose, valve 17 is preferably designed as a switching valve and is open in its deenergized condition. It is favorably connected electrically to a monitoring unit inside the electronic unit 25 of the pressure-supplying module. When the monitoring unit detects a critical error in a controlling module of the electronic unit 25 during a brake operation, it will deactivate the unit 25 and thus move the pressure control valves 15 and 16 into their closed position. Simultaneously, the switching valve 17 is energized, and thus the closure of the space 11 provided for this case of fault is safeguarded. The brake system can still be mastered by the driver even in the event of current failure, where naturally a solenoid valve cannot be actuated, as will be put forth in the following explanations: The temperature-responsive change in volume of the pressure fluid takes place comparatively slowly so that the opening cross-section of the valve 17 can be kept very small. This provision ensures that when all valves 15, 16, 17 adopt the illustrated deenergized switching position in the case of current failure, the pressure fluid disposed in the space 11 can escape into the pressure fluid supply tank 18 only at a very slow rate. This prevents a sudden pedal travel loss, irritating the driver, even in the event of current failure.

The above-mentioned simulator chamber 21 arranged in the fourth piston 8 is a component part of a hydraulic shut-off device for coupling the movements of the first piston (2) and the third piston (5) or the fourth piston 8, respectively, which is activated depending on the displacement travel of the third piston 5 in the housing 20. For this purpose, a hydraulic connection is established between the simulator chamber 21 and a pressure fluid supply tank 31 associated with the master brake cylinder 1, the said connection leading via a passage 32 in the third piston 5 to a section 33 in the fourth piston 8, which opens into the simulator chamber 21. Upon application of the brake pedal, initially the fourth piston 8 displaces in the third piston 5 due to an appropriate spring arrangement. This causes the hydraulic passage 35 to close, and pressure can develop in the hydraulic chamber 9, which is delivered through the hydraulic connection 26 to the pressure-supplying module 13, causing it to introduce a boosted pressure into the space 11. Thus, the master brake cylinder 1 is actuated, on the one hand, and the third piston 5 is pressed against its stop 27 on the housing, on the other hand, whereby the hydraulic passage 32 stays open and the pedal travel simulator operable. With insufficient or lacking booster pressure in the space 11, the third piston 5 displaces in the housing 20, with the result that the hydraulic passage 32 closes and the pedal travel simulator is disabled, because the movement of the third piston 5 is coupled hydraulically to the movement of the first piston 2. A low rate of resiliency in this coupling arrangement due to the small quantity of hydraulic fluid that displaces through the connection 26 into the valve assembly 10 is tolerated. In this arrangement, the hydraulic connections comprised in the shut-off device can serve as hydraulic throttling elements for hydraulically damping the pedal travel simulator 7, and at least one of the hydraulic throttling elements can exhibit a performance that depends on the direction of flow.

In a first (normal) operating mode, i.e. in a hydraulic booster operating mode, actuation of the pressure increase valve 15 causes a pressure to develop in the space 11, due to the effect of which the third piston 5 is shifted to the left, as viewed in the drawing, while the second piston 4 is pushed to the right. The first operating mode is illustrated by the surface 'A' in the diagram of FIG. 2. The pressure reduction valve 16 is energized for the purpose of electronically controlled pressure reduction. The pressure in the space 11 is rated in such a fashion that it is sufficient to keep the third piston 5 on its stop 27 in the housing 20 in opposition to the pedal force transmitted by way of the push rod 28. In other respects, the pressure in space 11 can be chosen freely so that any desired dependency of the brake pressure on the brake pedal application can be programmed. Undesirable pedal reactions are prevented. This electronic application pressure control is advantageous because its transmission behavior is freely selectable within the limits of the dynamics given by the technical data of pressure accumulator, pressure increase valve and separating valve. Therefore, a so-called jump-in function, i.e. jumping to a predetermined brake pressure value when the brake pedal 3 is touched lightly, a brake assist function, a deceleration control, and autonomous braking, as it is e.g. required for TCS (Traction Slip Control), ESP (Electronic Stability Program), and ACC (Adaptive Cruise Control) can be realized by software measures. To this end, the driver's specification in the form of a brake pedal application is sensed by travel sensors, force sensors, or other types of sensors and converted into wheel brake pressures by means of a calculator unit (not shown explicitly) employing appropriate algorithms, which pressures are realized by means of the electronically switchable valves in the pressure-supplying module and the subsequent ABS control module.

Figure 2:
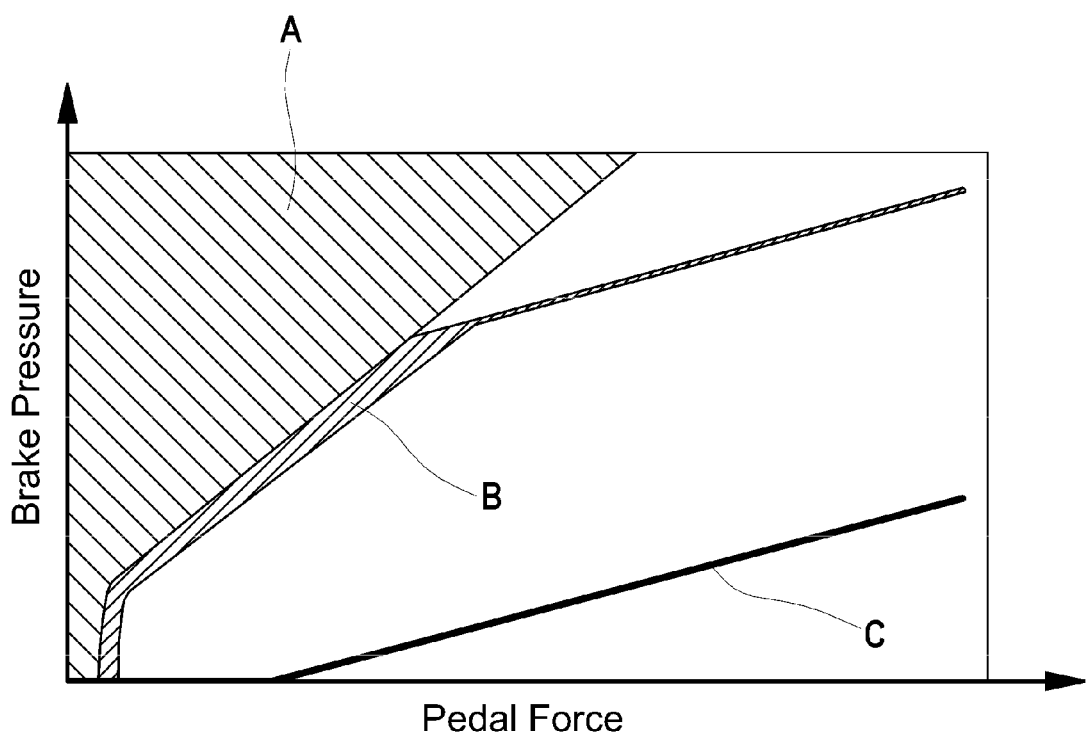
FIG. 2 shows a diagrammatic view of three operating modes that can be realized in the brake system.

In a second operating mode, which is illustrated by the course 'B' in the diagram according to FIG. 2 and corresponds to a first fallback mode, the residual pressure that prevails in the high-pressure accumulator 22 is used for the pressure buildup in the space 11. The pressure buildup is hydraulically controlled by the above-mentioned control valve assembly 10, which is actuated by means of the pressure introduced into the compartment 9 due to the movement of the fourth piston 8.

In a third operating mode, which is characterized by the lack of pressure produced by the hydraulic pressure-supplying module 13 and is illustrated by the course 'C' in the diagram according to FIG. 2, the brake system can be actuated purely mechanically, the third piston 5 moves away from its stop 27 under the influence of brake pedal application and displaces the second piston 4 by mechanical contact. The master brake cylinder 1 is actuated exclusively by using muscle power.

The invention allows achieving a brake system of a simple design, in which the brake pedal characteristics does not depend on the actuating condition of the remaining brake system, with the result that in the event of a brake operation by the driver, the pedal feeling can neither be disturbed by the simultaneous existence of an independent brake operation, nor by any other control activities of the brake system such as anti-lock control, traction control, or driving stability control.

The additional advantage of the brake system can be seen in its simpler design compared to conventional brake systems. Vehicles equipped with an electronic stability control function (ESP) e.g. require a special ESP hydraulics, which is more complicated than a normal ABS hydraulics because it is required to also inhere the ability of building up wheel brake pressures in excess of the master cylinder pressure, what is in contrast to the ABS hydraulics.

In vehicles equipped with the brake system of the invention at issue, there is no need for any special ESP hydraulics because the independent braking hydraulics of the invention in connection with a conventional ABS system achieves a far better function. A smaller number of electromagnetically operable valves are required, as compared to a conventional ESP hydraulics. In addition, the brake system of the invention presents a better energy balance and development of less noise than in a conventional ESP hydraulics because the transfer of brake fluid by pumping, which is necessary in the ESP operation in order to generate dynamic pressure at a pressure-limiting valve, is eliminated. The noise behavior can be improved also in comparison to the indicated state of the art because noise-producing components such as valves, motors or pumps are not arranged inside the module enclosed by housing 8, which is coupled to the splashboard in the vehicle that is critical in terms of solid-borne sound.

The disclosed object of maintaining brake boosting in the event of a brief failure of the electric energy supply is achieved in that only the operating mode A requires the existence of electric energy, while the operating mode B requires only hydraulic energy.

The invention claimed is:

1. A brake system for motor vehicles comprising
   a master cylinder (1),
   a first piston (2) which is coupled to a brake pedal (3) by way of a push rod (28) that transmits actuating forces,
   a second piston (4) for actuating the master cylinder (1),
   a third piston (5) which is configured to be actuated by the first piston (2) and to be moved into a force-transmitting connection with the second piston (4),
   at least one elastic element (6, 7) forming a pedal travel simulator,
   a coupling element for coupling the movements of the first and the third pistons, said coupling element being activated depending on the displacement travel of the third piston (5) in a housing (20),
   a space (11) between the second (4) and the third pistons (5) to which hydraulic pressure is applicable, and pressurization of the space (11) loads the second and third pistons (4, 5) in opposite direction,
   as well as a pressure-supplying module (13), which enables both filling of the space (11) with pressure fluid as well as its evacuation,
   wherein a fourth piston (8) is arranged between the first piston (2) and the third piston (5) and delimits a hydraulic compartment (9) in interaction with the third piston (5), wherein said compartment has a hydraulic connection to a pressure fluid supply tank (31) closable by a brake pedal application and wherein said compartment is configured to allow a hydraulic pressure build-up by actuating forces, and wherein the hydraulic pressure introduced into the compartment (9) allows actuating a valve assembly (10), which varies the pressure introduced into the space (11).

2. The brake system as claimed in claim 1, wherein the valve assembly (10) is integrated in the pressure-supplying module (13).

3. The brake system as claimed in claim 1, wherein the elastic element (6) is interposed between the push rod (28) and the fourth piston (8) in terms of effect.

4. The brake system as claimed in claim 1, wherein a hydraulic shut-off device is provided to couple the movements of the first piston (2) and the third piston (5), which is activated depending on the displacement travel of the third piston (5) in the housing (20).

5. The brake system as claimed in claim 4, wherein hydraulic connections in the shut-off device serve as hydraulic throttling elements for hydraulically damping the pedal travel simulator (7).

6. The brake system as claimed claim 5, wherein at least one of the hydraulic throttling elements exhibits a performance that depends on the direction of flow.

7. The brake system as claimed in claim 4, wherein the shut-off device is a simulator chamber (21), which is delimited by the third piston (8) and first piston (2), which is filled with pressure fluid and is in a connection with a pressure fluid supply tank (31) while the shut-off device is not activated.

8. The brake system as claimed in claim 7, wherein the compartment (9) is connected to the simulator chamber (21) by means of a passage (35), which is closable by a relative movement of the fourth piston (8) with respect to the third piston (5).

9. The brake system as claimed in claim 8, wherein the passage (35) is an opening provided in an end wall of the fourth piston (8), which cooperates with a sealing element (36) arranged at the third piston (5).

10. The brake system as claimed in claim 7, wherein a seal associated with the compartment (9) allows a flow of fluid when the brake pedal is not applied, and sealing is executed by way of a relative displacement of the fourth piston (8) with respect to the third piston (5).

11. The brake system as claimed in claim 1, wherein a sensor (37) for determining an angle of rotation is provided to detect position and movement of the brake pedal, and wherein the output signal of the sensor is sent to an electronic control unit (25) and serves to actuate the pressure-supplying module (13).

12. The brake system as claimed in claim 1, wherein a pressure sensor (24) is provided to sense the hydraulic pressure output by the pressure-supplying module (13), the output signal of which is sent to an electronic control unit (25).

13. The brake system as claimed in claim 12, wherein the pressure-supplying module (13) comprises a hydraulic high-pressure accumulator (22).

14. The brake system as claimed in claim 13, wherein the pressure-supplying module (13) comprises a means for charging the high-pressure accumulator (22).

15. The brake system as claimed in claim 12, wherein the electronic control unit (25) is associated with the pressure-supplying module (13).

16. The brake system as claimed in claim 15, wherein the electronic control unit (25) of the pressure-supplying module (13) and an electronic control unit (30) of a wheel brake pressure modulation module (29) form a combined construction unit.

17. The brake system as claimed in claim 16, wherein the pressure-supplying module (13) and the wheel brake pressure modulation module (29) form a combined construction unit.

18. The brake system as claimed in claim 1, wherein the pressure-supplying module (13) contains electrically controllable valves (15, 16, 17).

* * * * *